United States Patent
Toda et al.

(10) Patent No.: US 12,393,154 B2
(45) Date of Patent: Aug. 19, 2025

(54) IMAGE FORMING APPARATUS THAT APPLIES A RESISTANCE FORCE TO A DOOR OF THE IMAGE FORMING APPARATUS

(71) Applicant: CANON KABUSHIKI KAISHA, Tokyo (JP)

(72) Inventors: Yukinojo Toda, Saitama (JP); Takahiro Ito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/489,052

(22) Filed: Oct. 18, 2023

(65) Prior Publication Data

US 2024/0142910 A1 May 2, 2024

(30) Foreign Application Priority Data

Oct. 27, 2022 (JP) .................................. 2022-172451

(51) Int. Cl.
*G03G 21/16* (2006.01)
*H04N 1/00* (2006.01)

(52) U.S. Cl.
CPC ..... *G03G 21/1633* (2013.01); *H04N 1/00543* (2013.01); *H04N 1/00559* (2013.01)

(58) Field of Classification Search
CPC ........... G03G 21/1633; H04N 1/00543; H04N 1/00559
See application file for complete search history.

(56) References Cited

U.S. PATENT DOCUMENTS

| | | | |
|---|---|---|---|
| 9,382,736 B2 | 7/2016 | Tejima | |
| 10,025,259 B2 | 7/2018 | Doi et al. | |
| 10,191,443 B2 | 1/2019 | Iwase | |
| 2016/0102488 A1* | 4/2016 | Doi | G03G 21/1633 49/350 |
| 2016/0159588 A1 | 6/2016 | Mizuguchi | |

FOREIGN PATENT DOCUMENTS

| | | |
|---|---|---|
| JP | 2015036728 A | 2/2015 |
| JP | 2016078271 A | 5/2016 |
| JP | 2016109781 A | 6/2016 |
| JP | 2017191164 A | 10/2017 |
| JP | 2020046516 A | 3/2020 |

* cited by examiner

*Primary Examiner* — Sophia S Chen
(74) *Attorney, Agent, or Firm* — ROSSI, KIMMS & McDOWELL LLP

(57) ABSTRACT

An image forming apparatus including an apparatus body, a door, and a resistance applying portion. The resistance applying portion includes a body support member, and a contact member. The contact member includes a first member supported by the door, and a second member supported by the first member. The second member is configured to be brought into the contracted position in a state where the door is in the closed position. The second member is configured to be brought into the extended position by the door having moved from the closed position to a first intermediate position located between the closed position and the opening position. In response to the door moving from the first intermediate position to the opening position, the second member is configured to apply the resistance force to the door by coming into contact with the body support member in the extended position.

10 Claims, 9 Drawing Sheets

IMAGE FORMING APPARATUS THAT APPLIES A RESISTANCE FORCE TO A DOOR OF THE IMAGE FORMING APPARATUS

BACKGROUND OF THE INVENTION

Field of the Invention

This disclosure relates to an image forming apparatus such as a printer, a copier, a facsimile, or a multifunction machine.

Description of the Related Art

In image forming apparatuses, opening/closing doors are disposed so as to allow workers to access inside of apparatus bodies. The opening/closing doors allow the workers to perform the jam processing of removing sheets stuck in sheet conveyance paths within the apparatus bodies and the maintenance processing of various units housed in the apparatus bodies. The opening/closing doors are disposed pivotably around pivot axes arranged in the apparatus bodies as pivot centers. However, if the opening/closing doors are pivoted at a high speed, there is a possibility that the opening/closing doors may collide with the apparatus bodies with substantial forces and, thereby, may create damage to such as the opening/closing doors and the apparatus bodies.

Therefore, hitherto, damper units for applying resistance forces to the opening/closing doors that pivot are disposed (Japanese Patent Laid-Open No. 2016-109781). The damper units include rotary dampers disposed in the apparatus bodies and rack members disposed in the opening/closing doors, and are configured to apply the resistance forces to the opening/closing doors by engaging pinion gears of the rotary dampers with rack gears of the rack members.

In the damper units described above, ranges in which the resistance forces can be applied to the opening/closing doors depend on the length of the rack members. That is, as the length of the rack members is increased, more extended areas in the rack members can be formed into the rack gears, so that the ranges in which the rotary dampers can apply the resistance forces can be enlarged. However, if the length of the rack members is enlarged, it is necessary to secure larger spaces for housing the rack members inside of the apparatus bodies when closing the opening/closing doors, so that the size of the apparatuses is increased. Therefore, there are some difficulties in applying the damper units.

SUMMARY OF THE INVENTION

According to one aspect of the present invention, an image forming apparatus configured to form an image on a sheet, the image forming apparatus including an apparatus body, a door provided in a pivotable manner between a closed position and an opening position with respect to the apparatus body, and a resistance applying portion configured to apply a resistance force with respect to the door in response to the door being pivoted. The resistance applying portion includes a body support member supported by the apparatus body, and a contact member that receives the resistance force by coming into contact with the body support member. The contact member includes a first member supported by the door, and a second member supported by the first member in a contractable and extendable manner between a contracted position contracted with respect to the first member and an extended position extended with respect to the first member. The second member is configured to be brought into the contracted position with respect to the first member in a state where the door is in the closed position. The second member is configured to be brought into the extended position with respect to the first member by the door having moved from the closed position to a first intermediate position located between the closed position and the opening position. In response to the door moving from the first intermediate position to the opening position, the second member is configured to apply the resistance force to the door by coming into contact with the body support member in the extended position.

Further features of the present invention will become apparent from the following description of exemplary embodiments with reference to the attached drawings.

DESCRIPTION OF THE EMBODIMENTS

Image Forming Apparatus

Figure 1:
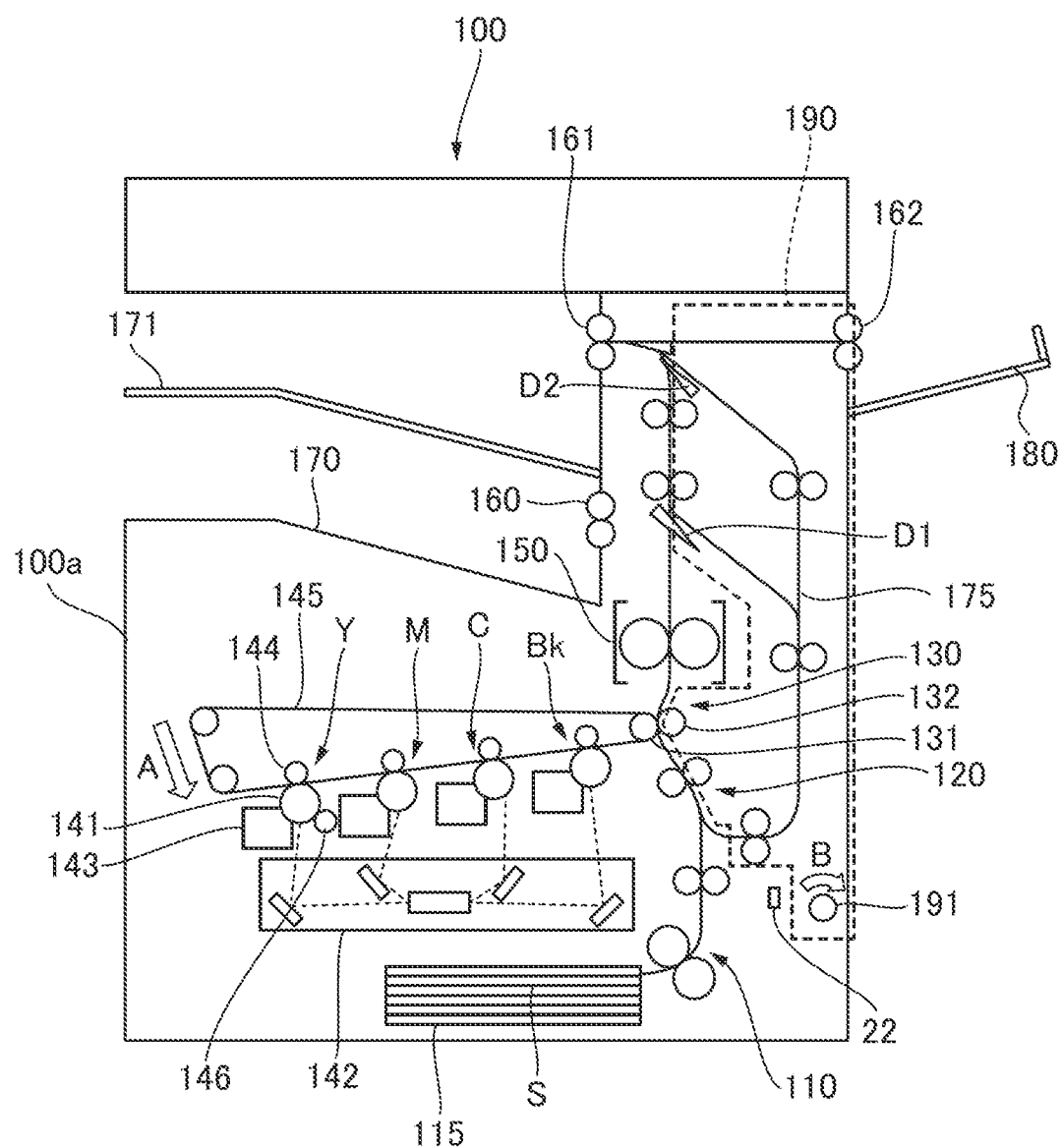
FIG. 1 is a schematic diagram illustrating an image forming apparatus of the present embodiment.

Hereinafter, an image forming apparatus of the present embodiment will be described. FIG. 1 is a schematic diagram illustrating the image forming apparatus 100 of the present embodiment. The image forming apparatus 100 is an image forming apparatus of an intermediate transfer tandem system in which a plurality of image forming stations (Y, M, C, and Bk) are arranged in sequence along an endless intermediate transfer belt 145. In the present embodiment, the image forming stations (Y, M, C, and Bk) are disposed for each color of yellow, magenta, cyan, and black.

A sheet S is supplied from a cassette 115 by a sheet feed unit 110 in synchronization with a timing of image formation. The sheet S supplied by the sheet feed unit 110 is conveyed to a registration roller 120 by passing through a conveyance path. After having performed skew correction and timing correction in the registration roller 120, the sheet S is sent to a secondary transfer portion 130.

The secondary transfer portion 130 is formed by a secondary transfer inner roller 131 and a secondary transfer outer roller 132 arranged substantially opposite to each other across the intermediate transfer belt 145. The secondary transfer portion 130 serves as a toner image transfer portion transferring the toner image onto the sheet S. In the secondary transfer portion 130, when the sheet S is nipped and conveyed, a secondary transfer voltage is applied to either the secondary transfer inner roller 131 or the secondary transfer outer roller 132, and the toner image that has been primarily transferred onto the intermediate transfer belt 145 is secondarily transferred onto the sheet S as described below.

Next, an image forming process to form the toner image on the intermediate transfer belt 145, which is performed in parallel with the conveyance process, described above, of the sheet S to the secondary transfer portion 130, will be described. In each of the image forming stations (Y, M, C, and Bk), a charge unit 146, a developing unit 143, and a primary transfer roller 144 are arranged around a rotating photosensitive drum 141 as a center.

In the present embodiment, the image forming stations (Y, M, C, and Bk) are configured substantially similarly except that different colors of toners, namely yellow, magenta, cyan, and black are used in the developing units. Therefore, hereinafter, the image forming station Y will be described by putting reference characters only on the image forming station Y in FIG. 1, and descriptions of the other image forming stations (M, C, and Bk) will be omitted.

The photosensitive drum 141 is an electrophotographic photosensitive member, and rotatably driven by a drive motor, not shown, in a counter-clockwise direction in FIG. 1. The charge unit 146 uniformly charges a surface of the photosensitive drum 141. An exposing unit 142 forms an electrostatic latent image on the surface of the photosensitive drum 141 by scanning, using a rotating mirror, a laser beam which has been On-Off modulated with scan line image data developed from a decomposed color image of each color. To be noted, in the present embodiment, the exposing unit 142 is disposed separately from the image forming station Y, and forms the electrostatic latent images on the photosensitive drums of not only the image forming station Y but also the other image forming stations (M, C, and Bk).

The electrostatic latent image formed on the photosensitive drum 141 is developed to the toner image by the developing unit 143 using developer. The primary transfer roller 144 comes into contact with the intermediate transfer belt 145, and forms a primary transfer portion between the photosensitive drum 141 and the intermediate transfer belt 145. By applying a primary transfer voltage to the primary transfer roller 144, the toner image on the photosensitive drum 141 is primarily transferred onto the intermediate transfer belt 145.

The intermediate transfer belt 145 is rotatably driven in an arrow A direction in FIG. 1. The image forming process executed in parallel by each of the image forming stations (Y, M, C, and BK) is performed in a timing of superimposing the toner image on an upstream toner image that has been primarily transferred onto the intermediate transfer belt 145. Consequently, eventually, a full color toner image is formed on the intermediate transfer belt 145, and conveyed to the secondary transfer portion 130.

Through the conveyance process of the sheet S and the image forming process each described above, the full color toner image is secondarily transferred onto the sheet S in the secondary transfer portion 130. Thereafter, the sheet S is conveyed to a fixing unit 150. While applying a predetermined pressing force to the sheet S using opposing rollers, the fixing unit 150 fixes the toner image on the sheet S by heating the sheet S using a heater, not shown, via a roller.

In accordance with a switch of the conveyance path by a first switching flapper D1, the sheet S on which the toner image has been fixed by the fixing unit 150 is discharged onto either a first sheet discharge tray 170 by a first sheet discharge roller 160 or a second sheet discharge tray 171 by a second sheet discharge roller 161. Alternatively, the sheet S on which the toner image has been fixed is discharged onto a third sheet discharge tray 180 by a third sheet discharge roller 162. In this case, the second sheet discharge roller 161 can convey the sheet S, which has been conveyed from the fixing unit 150, toward the third sheet discharge roller 162 by reversing the sheet S after having switched the conveyance path using a second switching flapper D2. Further, in a case of duplex printing to form the toner image also on the back of the sheet S, the sheet S on which the toner image has been fixed on one surface, is reversed by the second sheet discharge roller 161, and is conveyed to a reconveyance path 175 by a switch of the second switching flapper D2. Thereafter, after the toner image has been formed and fixed on the other surface, the sheet S is discharged to one of the first, second, and third sheet discharge trays 170, 171, and 180.

An opening/closing door 190 is disposed in an apparatus body 100a of the image forming apparatus 100 (refer to a dashed line portion in FIG. 1). The opening/closing door 190 is supported by a pivot shaft 191, and disposed in the apparatus body 100a in a manner pivotable between a closed position and an opening position around the pivot shaft 191 as a pivot center. While an illustration is omitted, the opening/closing door 190 is maintained in a closed state (closed position) by the engagement of an engagement portion of the apparatus body 100a with a hook portion of the opening/closing door 190. Upon an operation to pull a handle 192 (refer to FIG. 2A) of the opening/closing door 190, the engagement between the engagement portion and the hook portion is released, and the opening/closing door 190 is brought into a state pivotable between the closed position and an opening direction (arrow B direction) in FIG. 1.

When the opening/closing door 190 is opened, access to an interior of the apparatus body 100a by a worker is enabled. In a case where, for example, the worker wants to perform jam processing of removing the sheet S stuck in the conveyance path or maintenance such as replacing parts, the worker merely needs to open the opening/closing door 190 by pulling the handle 192.

Configuration of Damper Unit

Figure 2A:
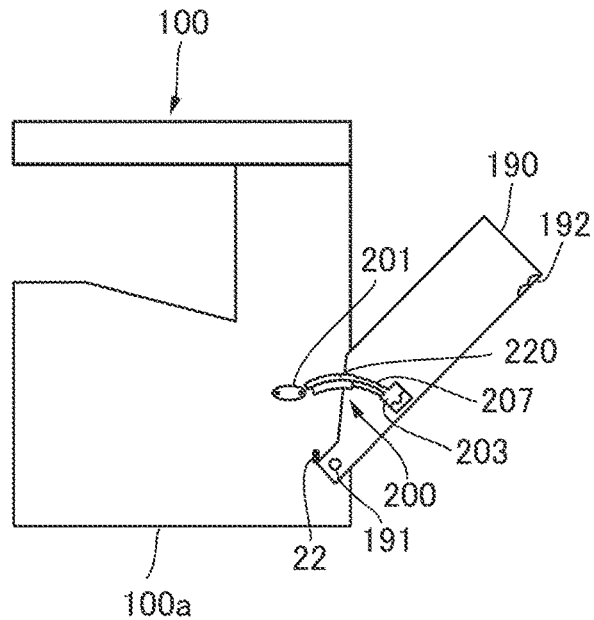
FIG. 2A is a side view illustrating an opening/closing door and a damper unit.

The image forming apparatus 100 of the present embodiment includes a damper unit 200, serving as a resistance applying portion that applies a resistance force with respect to the opening/closing door 190 when the opening/closing door 190 is pivoted. A configuration of the damper unit 200 will be described using FIGS. 2A to 2D. As illustrated in FIG. 2A, the damper unit 200 includes a rotary damper 201 and a rack member 220. The rotary damper 201, serving as a body support member, is supported by the apparatus body 100a. The rack member 220, serving as a contact member, is secured to the opening/closing door 190, and moves with respect to the rotary damper 201 in accordance with the opening and closing of the opening/closing door 190.

Figure 2C:
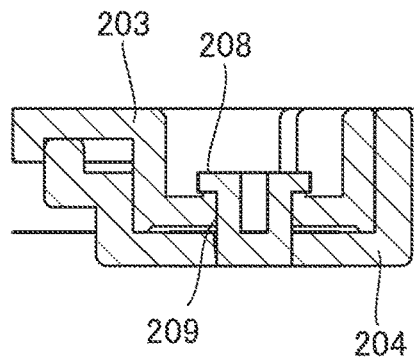
FIG. 2C is a cross-sectional view of a first member and a second member taken along a line A-A in FIG. 2B.
Figure 2D:
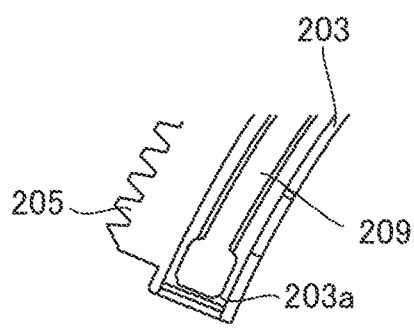
FIG. 2D is an enlarged view illustrating a part of the first member.
Figure 2B:
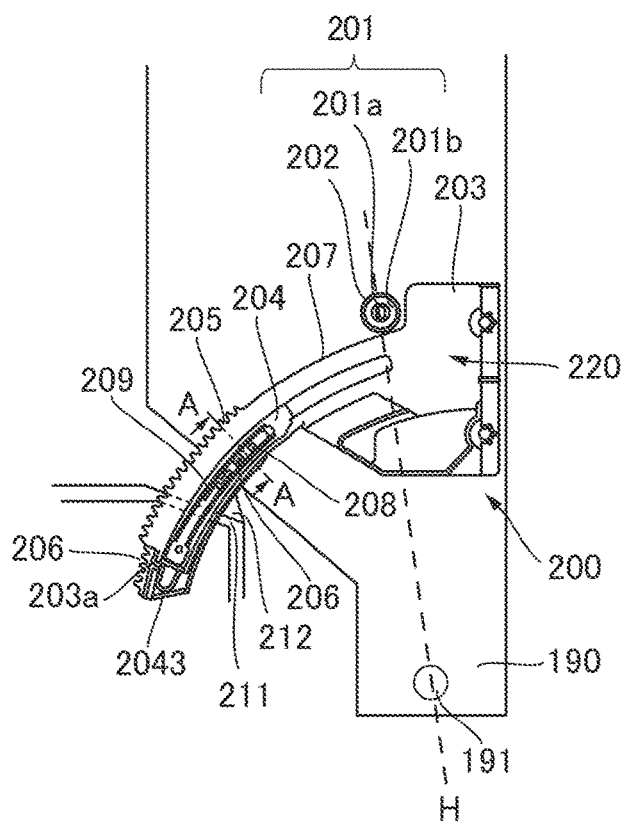
FIG. 2B is an enlarged view illustrating the damper unit.

As illustrated in FIG. 2B, the rotary damper 201 includes a shaft center 201a secured to the apparatus body 100a, a damper portion 201b, and a pinion gear 202. The pinion gear 202 is rotatably supported with respect to the shaft center 201a, and the damper portion 201b, by being interposed between the shaft center 201a and the pinion gear 202, attenuates a force in a rotational direction of the pinion gear 202.

The rack member 220 is constituted from a first member 203 including a rack gear 205 and a second member 204 including a rack gear 206. The second member 204 is supported by the first member 203 in a contractable and extendable manner between a contracted position in a state of being contracted with respect to the first member 203 and an extended position in a state of being extended with respect to the first member 203. In a case of the present embodiment, the first member 203 is secured to the opening/closing door 190. Further, the first and second members 203 and 204 are fitted to each other in such a manner that, when viewed in an axial direction of the pivot shaft 191, the second member 204 can contract and extend with respect to the first member 203 between the contracted position and the extended position described above along an arc-shaped path around the center of the pivot shaft 191 as a center.

As illustrated in FIG. 2C, in the second member 204, a retention portion 208 is disposed in a manner projecting toward the first member 203, and the detachment of the first member 203 from the second member 204 is prevented by the retention portion 208. That is, an elongated hole 209 extending along the arc-shaped path is formed in the first member 203, and the retention portion 208 is passed through this elongated hole 209, so that the first and second members 203 and 204 are fitted to each other in a manner of being prevented from being detached.

Figure 2E:
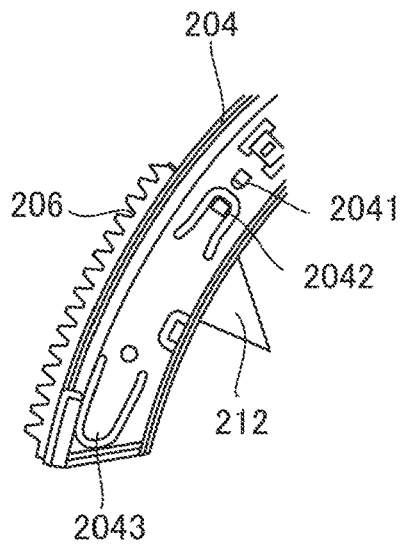
FIG. 2E is an enlarged view illustrating a part of the second member.

As illustrated in FIG. 2D, in the first member 203, a stopper 203a is disposed upright toward the second member 204 on a side of an end opposite to a side secured to the opening/closing door 190. On the other hand, as illustrated in FIG. 2E, in the second member 204, engaging hooks 2041, 2042, and 2043 are disposed upright with respect to the second member 204. The engaging hook 2043 is arranged on a far side from the opening/closing door 190.

The engaging hook 2043 is disposed so as to engage the second member 204 with the apparatus body 100a. While described below, in the present embodiment, by engaging the second member 204 with the apparatus body 100a when opening the opening/closing door 190, the second member 204 is held with respect to the apparatus body 100a. Thereby, the second member can move from the contracted position to the extended position with respect to the first member 203.

The engaging hook 2041 is arranged on a side close to the opening/closing door 190. The engaging hook 2042 is arranged on a side farther from the opening/closing door 190 than the engaging hook 2041, and is arranged with a gap from the engaging hook 2041 in between. The size of the gap between the engaging hooks 2041 and 2042 is such that the stopper 203a of the first member 203 can engage. It is acceptable if the gap between the engaging hooks 2041 and 2042 is slightly larger than the thickness of the stopper 203a. The engaging hooks 2041 and 2042 and the stopper 203a are disposed so as to engage the first member 203 with the second member 204 and hold the second member 204 by the first member 203 in a state in which the second member 204 is extended. In a state in which the first and second members 203 and 204 are engaged with each other, the first and second members 203 and 204 move integrally in a state in which the combined length of the first and second members 203 and 204 is longest.

Further, in the second member 204, a regulation portion 212 is disposed to a side surface portion on a side opposite to the rack gear 206, described below. In the apparatus body 100a, a contacted portion 211 (refer to FIG. 2B) against which the regulation portion 212 abuts is disposed. While described below, in the present embodiment, by abutting the regulation portion 212 against the contacted portion 211 when closing the opening/closing door 190, a movement of the second member 204 with respect to the apparatus body 100a is regulated, and the second member 204 is contracted with respect to the first member 203.

As illustrated in FIG. 2B, the rotary damper 201 includes the shaft center 201a secured to the apparatus body 100a, the damper portion 201b, and the pinion gear 202. The pinion gear 202 is rotatably supported with respect to the shaft center 201a, and, by being interposed between the shaft center 201a and the pinion gear 202, the damper portion 201b attenuates the force in the rotational direction of the pinion gear 202.

In the present embodiment, the rack gear 205 that engages with the pinion gear 202 is disposed in the first member 203, and the rack gear 206 that engages with the pinion gear 202 is disposed in the second member 204. When viewed in the axial direction of the pivot shaft 191 (refer to FIG. 2A), the rack gear 205, serving as a first contact portion, and the rack gear 206, serving as a second contact portion, are arranged along a circumscribing circle circumscribing the pinion gear 202. The center of the pivot shaft 191 is a center of this circumscribing circle, and this configuration allows the rack gears 205 and 206 to engaged with the pinion gear 202. When opening and closing the opening/closing door 190, in accordance with pivots of the first and second members 203 and 204, the pinion gear 202 which is in a state engaging with either the rack gear 205 or 206 rotates. As described above, the force in the rotational direction of the pinion gear 202 is attenuated by the damper portion 201b, and the first and second members 203 and 204 receive the resistance force via the pinion gear 202. Thereby, the resistance force is applied to the opening/closing door 190.

Further, as illustrated in FIG. 2B, on a side (secured side) closer to the opening/closing door 190 than the rack gear 205, the first member 203 includes a gearless portion 207 that does not engage with the pinion gear 202. That is, the rack gear 205 whose length from the center of the pivot shaft 191, at the time of being positioned on a straight line H that, when viewed in the axial direction of the pivot shaft 191, passes through the shaft center 201a of the rotary damper 201 and the center of the pivot shaft 191 of the opening/closing door 190 becomes a first length is formed in the first member 203. Further, in the first member 203, the gearless portion 207 of a second length, which is shorter than the first length from the center of the pivot shaft 191 at the time of being positioned on the straight line H, is formed continuously with the rack gear 205 on a side closer to the opening/closing door 190.

When the pinion gear 202 faces the gearless portion 207 and is not engaged with the rack gear 205, the pinion gear 202 does not rotate, and the resistance force is not applied to the first member 203 by the damper portion 201b via the pinion gear 202. That is, the resistance force is not applied to the opening/closing door 190. The purpose of this is to allow the worker to start opening the opening/closing door 190 without exerting a large force.

Operation of Damper Unit

Next, an operation of the damper unit 200 will be described by dividing cases in accordance with an opening and closing operation of the opening/closing door 190. First, the operation of the damper unit 200 at the time of an opening operation for opening the opening/closing door 190 from the closed position to the opening position will be described using FIGS. 3A to 5C.

Figure 3A:
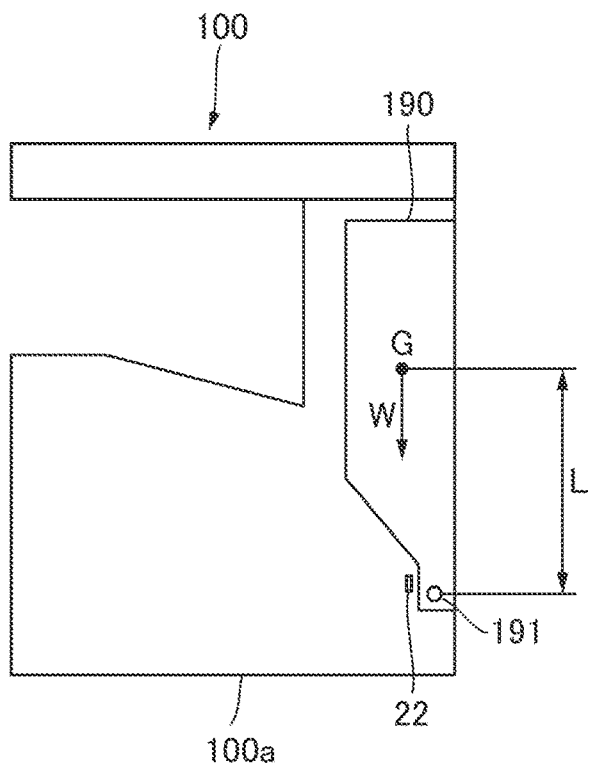
FIG. 3A is a side view illustrating the opening/closing door that is in a closed position.
Figure 3B:
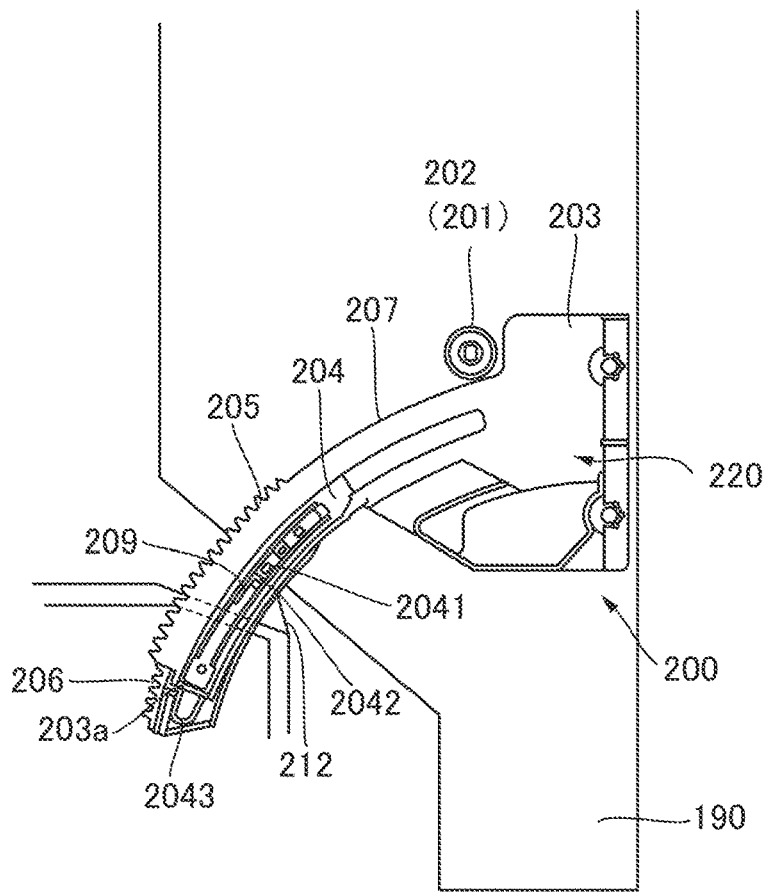
FIG. 3B is an enlarged view illustrating the damper unit in a case where the opening/closing door is in the closed position.

FIGS. 3A and 3B illustrate a case where the opening/closing door 190 is in the closed position. As illustrated in FIG. 3A, in the case where the opening/closing door 190 is in the closed position, in the opening/closing door 190, a gravitational force W that is an own weight acts on the center of gravity G which is separated upward from the center of pivot shaft 191 by a distance L in a vertical direction. Then, as illustrated in FIG. 3B, the second member 204 is in the contracted position contracted with respect to the first member 203, and the rack member 220 is housed in a space inside of the apparatus body 100a in a state in which the combined length of the first and second members 203 and 204 is shortest. Since, at this time, the engaging hooks 2041 and 2042, serving as a second engagement portion, and the stopper 203a do not engage with each other, the first and second members 203 and 204 are not engaging with each other. Further, since the engaging hook 2043, serving as a first engagement portion, and an apparatus body side stopper 210 do not engage with each other, the second member 204 is not engaging with the apparatus body 100a.

Figure 4A:
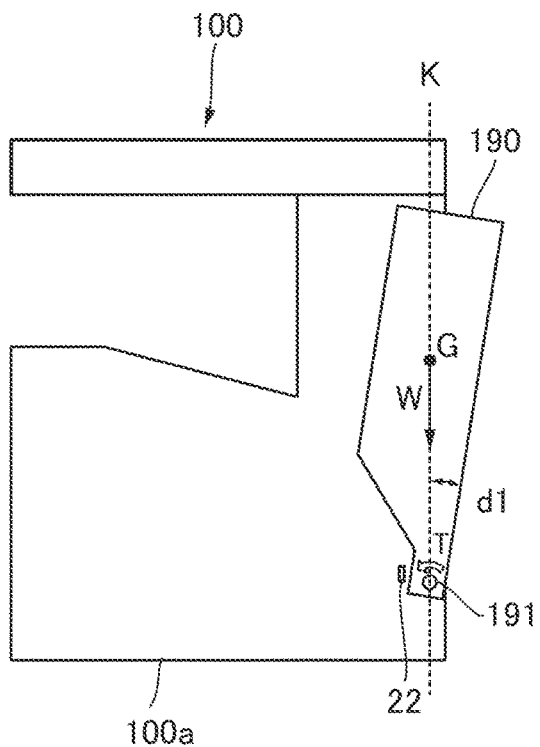
FIG. 4A is a side view illustrating the opening/closing door in a case where an opening of the opening/closing door is started.
Figure 4B:
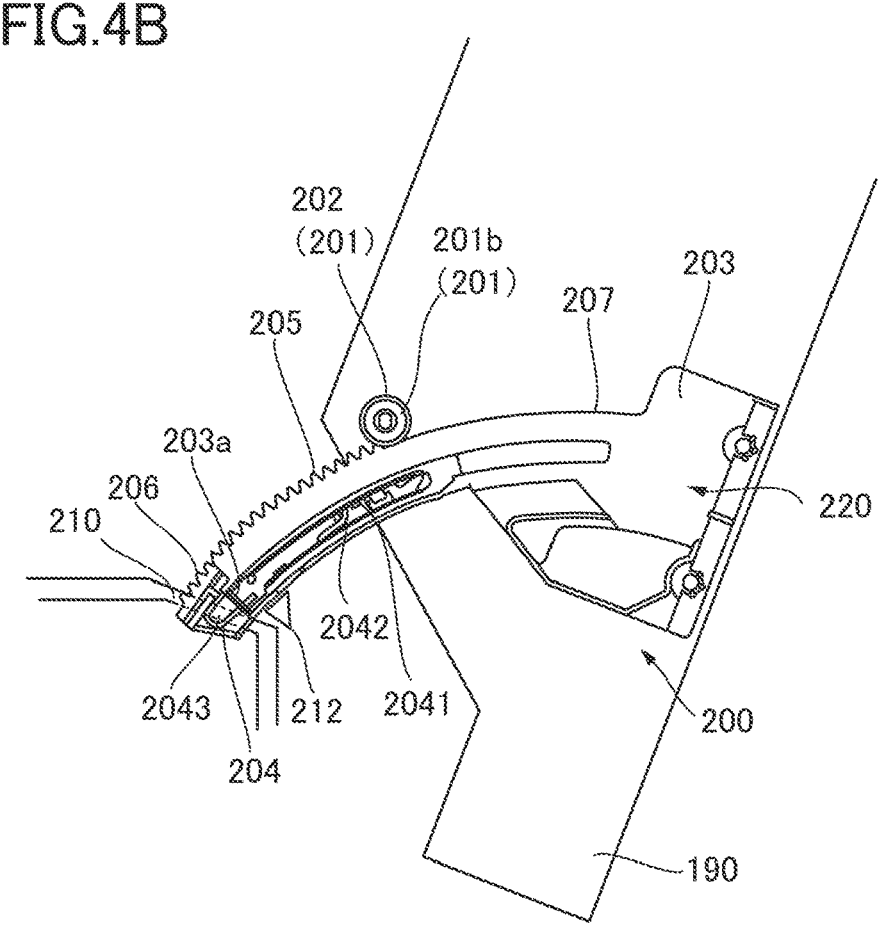
FIG. 4B is an enlarged view illustrating the damper unit in a case where the opening of the opening/closing door is started.

FIGS. 4A and 4B illustrate a case where the opening of the opening/closing door 190 is started from the closed position. In particular, a case where the opening/closing door 190 is opened by a pivot angle d1 from the closed position and the damper unit 200 begins to apply the resistance force T to the opening/closing door 190 is illustrated. In this case, as illustrated in FIG. 4A, the center of gravity G of the opening/closing door 190 overlaps a vertical line K that passes through the center of the pivot shaft 191. Along with the operation of opening the opening/closing door 190, once the center of gravity G of the opening/closing door 190 passes across the vertical line K, the damper unit 200, more specifically, the rotary damper 201 begins to apply the resistance force T to the opening/closing door 190.

Since, as illustrated in FIG. 4B, the gearless portion 207 of the first member 203 faces the pinion gear 202 until the center of gravity G of the opening/closing door 190 has passed across the vertical line K, the damper unit 200, more specifically, the rotary damper 201 does not apply the resistance force T to the opening/closing door 190. In this case, without receiving the resistance force T, the opening/closing door 190 is brought into a state of being slowly opened by the own weight. Thereafter, when the center of gravity G of the opening/closing door 190 has passed across the vertical line K, since the rack gear 205 and the pinion gear 202 engage with each other, the rotary damper 201 begins to apply the resistance force T. From the state illustrated in FIG. 3B to the state illustrated in FIG. 4B, the first and second members 203 and 204 move integrally in the opening direction. To achieve this, the first and second members 203 and 204 are fitted together (refer to FIG. 2C).

Since, as described above, the first member 203 is not engaged with the pinion gear 202 until the opening/closing door 190 has moved from the closed position to a second intermediate position located between the closed position and a first intermediate position, described below, the resistance force T is not applied to the opening/closing door 190. Then, since, in the first member 203, the rack gear 205 is engaged with the pinion gear 202 when the opening/closing door 190 moves from the second intermediate position to the first intermediate position, the resistance force T is applied to the opening/closing door 190. To be noted, since, in this case, the engaging hooks 2041 and 2042 do not engage with the stopper 203a, the first and second members 203 and 204 are not engaging with each other. In that case, the first and second members 203 and 204 move together. Then, since, when the engaging hook 2403 has engaged with the apparatus body side stopper 210, the second member 204 is engaged with the apparatus body 100a, only the first member 203 is moved thereafter.

To be noted, the torque of the damper portion 201b is set such that the resistance force T by the rotary damper 201 is less than the moment generated by the gravitational force W that is the own weight of the opening/closing door 190. That is, the relation that WL sin(d) is larger than T holds. Thereby, even if the worker releases a hand from the opening/closing door 190, the opening/closing door 190 opens slowly by the own weight while receiving the resistance force T by the rotary damper 201. Further, even if the opening/closing door 190 is opened while receiving a force by the worker in the opening direction, an excessive increase in a pivot speed of the opening/closing door 190 is prevented.

Figure 5A:
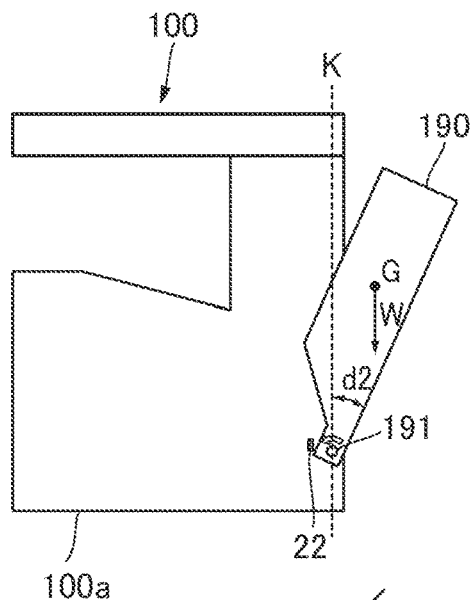
FIG. 5A is a side view illustrating the opening/closing door that is in the middle of the opening.
Figure 5B:
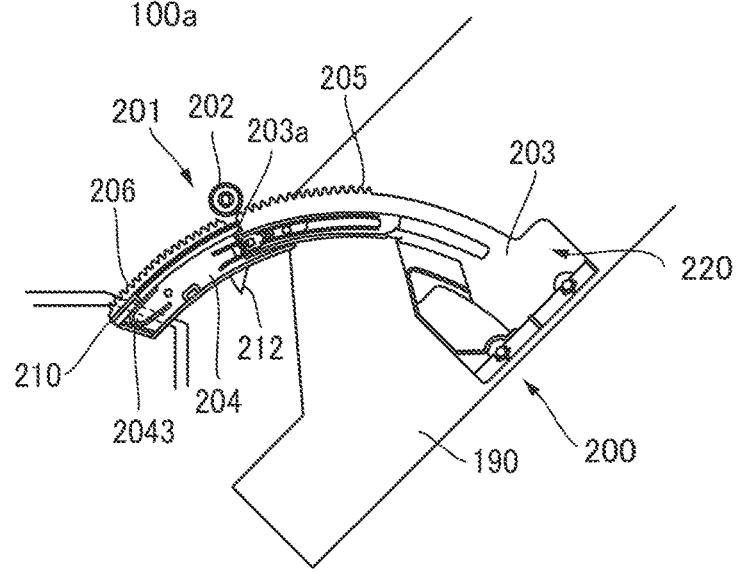
FIG. 5B is an enlarged view illustrating the damper unit in a case where the opening/closing door is in the middle of the opening.
Figure 5C:
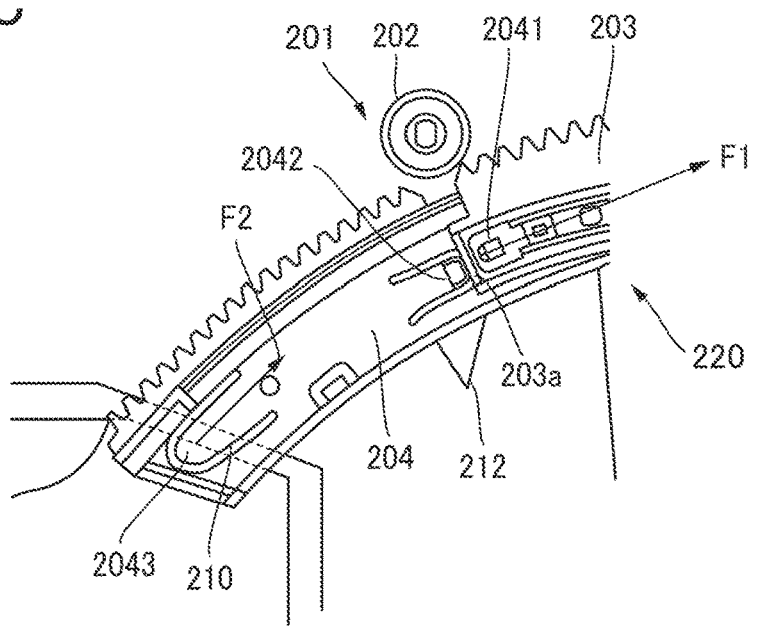
FIG. 5C is an enlarged view illustrating the first and second members in a case where the opening/closing door is in the middle of the opening.

FIGS. 5A to 5C illustrate a case where the opening/closing door 190 is in the middle of the opening. In particular, in this state, the opening/closing door 190 is in the middle of the opening while receiving the resistance force T. As illustrated in FIG. 5A, the opening/closing door 190 is opened from the closed position at a pivot angle d2 that is larger than the case illustrated in FIG. 4A (d2>d1), and the engagement of the engaging hook 2043 and the apparatus body side stopper 210 is immediately before disengagement.

By the opening/closing door 190 having moved from the closed position to the first intermediate position located between the closed position and the opening position, as illustrated in FIG. 5C, the second member 204 is brought into the extended position of the extended state extended with respect to the first member 203. That is, in a case where the opening/closing door 190 is opened from the state illustrated in FIG. 4A to the state illustrated in FIG. 5A, when in the state illustrated in FIG. 4A, the second member 204 is engaged with the apparatus body 100a as described above. On the other hand, the first member 203 moves in a state in which the rack gear 205 is engaged with the pinion gear 202. Thereby, by moving the first member 203 relatively with respect to the second member 204, the stopper 203a of the first member 203 engages with the engaging hook 2041 of the second member 204, and the first member 203 engages with the second member 204.

That is, by the opening/closing door 190 having moved from the closed position to a third intermediate position located between the closed position and the first intermediate position described above, the engaging hook 2043 and the apparatus body side stopper 210 engage the second member 204 with the apparatus body 100a, and, thereby, the second member 204 is held by the apparatus body 100a. When the opening/closing door 190 has moved from the closed position to the third intermediate position, the engaging hook 2041 and the stopper 203a engage the first and second members 203 and 204, and, thereby, the second member 204 is held in the extended position with respect to the first member 203. The first and second members 203 and 204 move integrally in the opening direction in that state.

As illustrated in FIG. 5C, by the engagement of the engaging hook 2043 with the apparatus body side stopper 210, an engagement force of the second member 204 and the apparatus body 100a becomes F2. Further, by the engagement of the engaging hook 2041 with the stopper 203a, an engagement force of the first and second members 203 and 204 becomes F1.

Figure 6A:
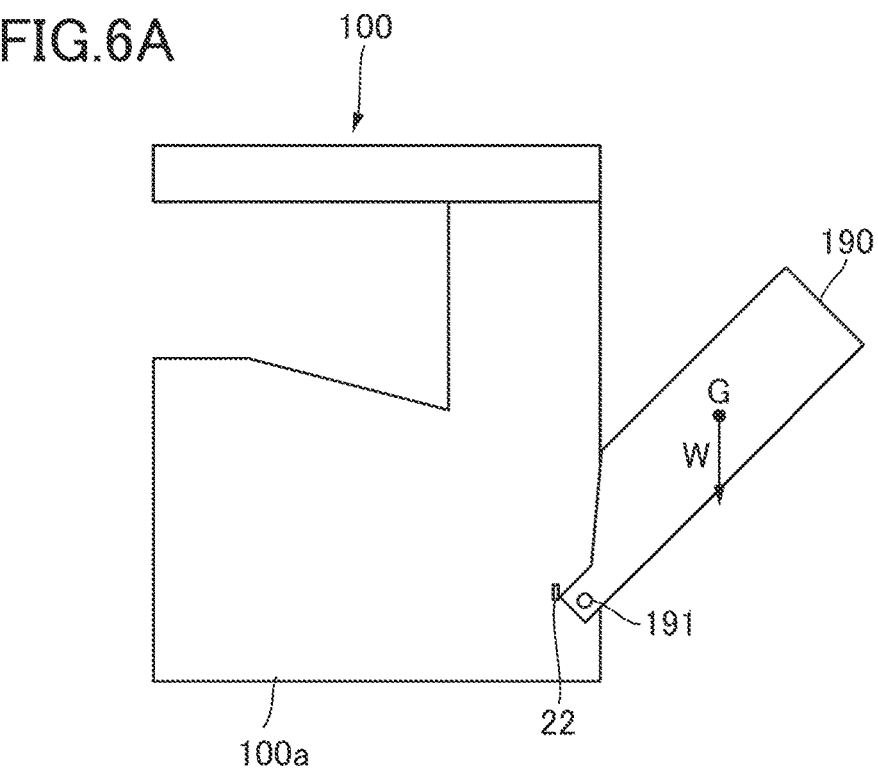
FIG. 6A is a side view illustrating the opening/closing door that is in an opening position.
Figure 6B:
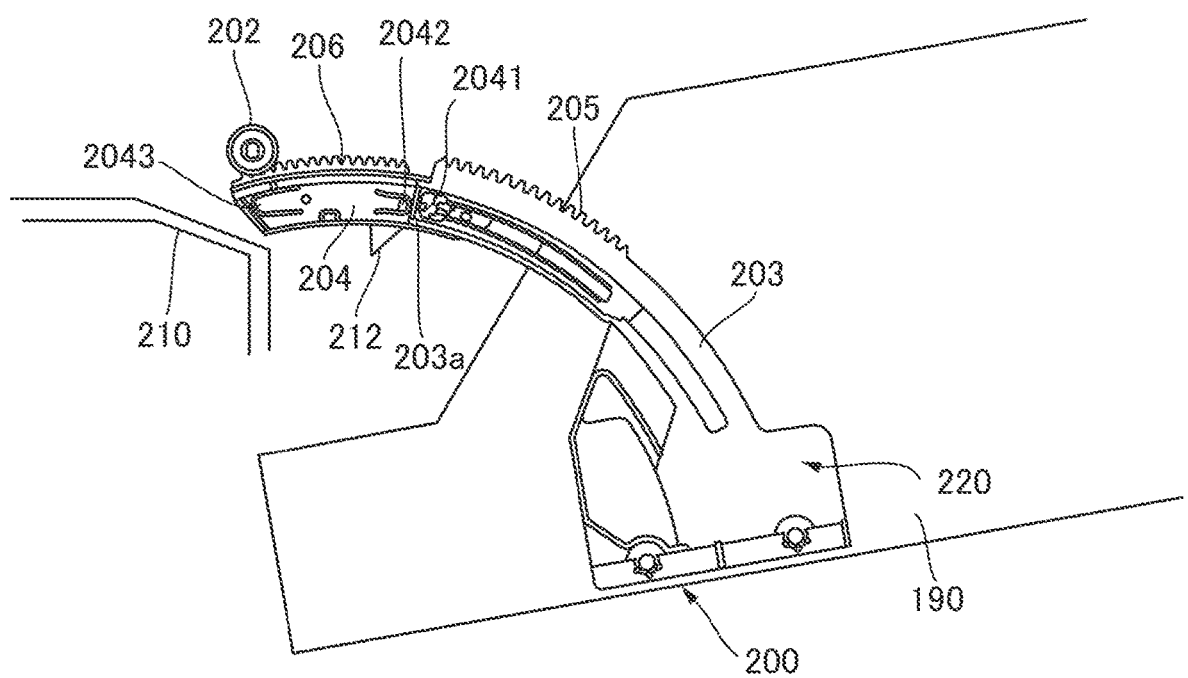
FIG. 6B is an enlarged view illustrating the damper unit in a case where the opening/closing door is in the opening position.

FIGS. 6A and 6B illustrate a case where the opening/closing door 190 is in the opening position. As illustrated in FIG. 6A, in the case where the opening/closing door 190 is in the opening position, the opening/closing door 190 comes into contact with a pivot regulation portion 22 disposed in the apparatus body 100a. The pivot regulation portion 22 regulates the pivot of the opening/closing door 190 in the opening direction from the opening position. Thereby, the opening/closing door 190 is held in the opening position. To be noted, the impact generated when the opening/closing door 190 is stopped by the pivot regulation portion 22 is mitigated to a small impact by the action of the damper unit 200.

As illustrated in FIG. 6B, when the opening/closing door 190 is moved from the third intermediate position described above to the opening position, since the stopper 203a is engaged with the engaging hook 2041 as described above, the engagement of the engaging hook 2043 and the apparatus body side stopper 210 is released. That is, due to the movement of the first and second members 203 and 204 that move integrally in the opening direction, the engagement between the engaging hook 2043 and the apparatus body side stopper 210 is released, and the second member 204 is drawn out from the space inside of the apparatus body 100a.

As described above, the engagement force of the second member 204 and the apparatus body 100a is F2, and the engagement force of the first and second members 203 and 204 is F1. The engagement of the engaging hook 2043 and the apparatus body stopper 210 and the engagement of the engaging hook 2041 and the stopper 203a are arranged such that, when opening the opening/closing door 190, the engagement force F1 becomes larger than the engagement force F2. In the present embodiment, from the closed position illustrated in FIG. 3B, through the state illustrated in FIG. 4B, to the state illustrated in FIG. 5B the worker can open the opening/closing door 190 with a force that is smaller than the engagement force F2. Then, in a case of opening the opening/closing door 190 further from the state illustrated in FIG. 5B, the worker needs to apply a force that is larger than the engagement force F2.

As described above, since the engagement force F2 is smaller than the engagement force F1, the worker can open the opening/closing door 190 by applying the force larger than the engagement force F2, without applying a force equal to or larger than the engagement force F1. Thereafter, the worker can continue to open the opening/closing door 190 with the force smaller than the engagement force F2. Since, as described above, the engagement force F2 is smaller than the engagement force F1, the engagement of the second member 204 and apparatus body 100a is released without releasing the engagement of the first and second members 203 and 204, so that the second member 204 is drawn out from the space inside of the apparatus body 100a.

As described above, when opening the opening/closing door 190, the damper unit 200 transitions from the state in which the rack gear 205 of the first member 203 engages with the pinion gear 202 to the state in which the rack gear 206 of the second member 204 engages with the pinion gear 202. Thereby, the resistance force is continuously applied to the opening/closing door 190 from the first member 203 to the second member 204.

Figure 7A:
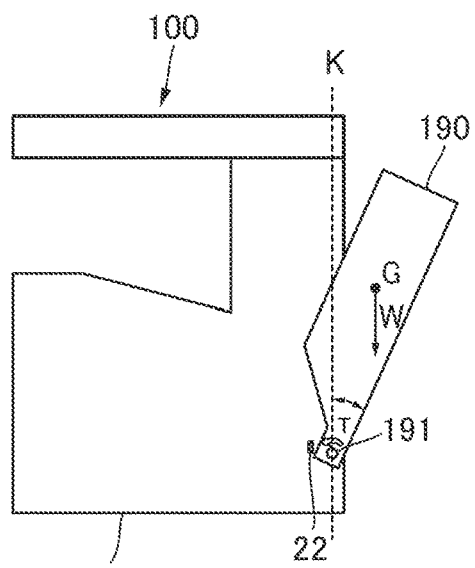
FIG. 7A is a side view illustrating the opening/closing door that is in the middle of closing.
Figure 7B:
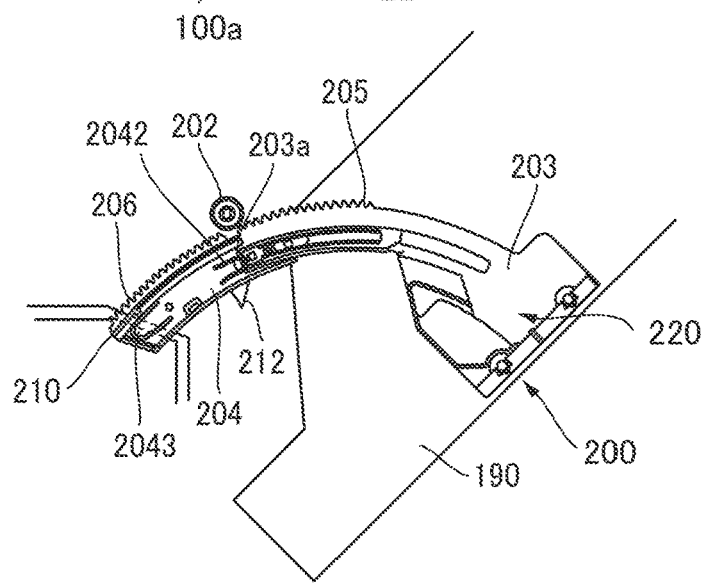
FIG. 7B is an enlarged view illustrating the damper unit in a case where the opening/closing door is in the middle of the closing.
Figure 7C:
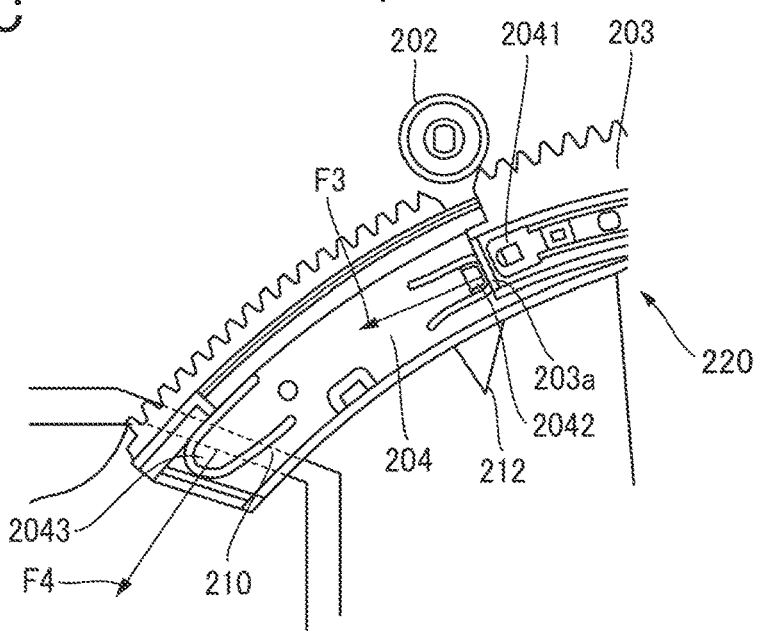
FIG. 7C is an enlarged view illustrating the first and second members in a case where the opening/closing door is in the middle of the closing.
Figure 8A:
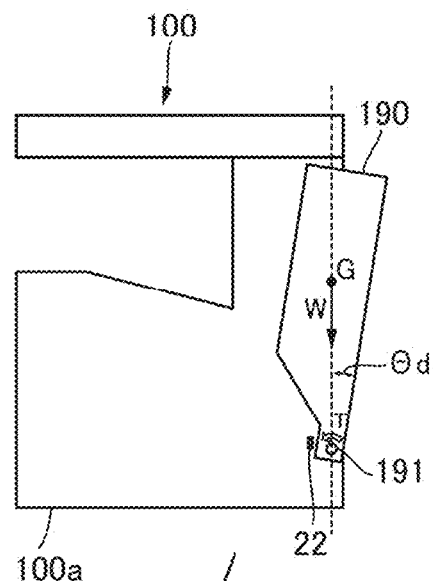
FIG. 8A is a side view illustrating the opening/closing door that is in the middle of the closing.
Figure 8B:
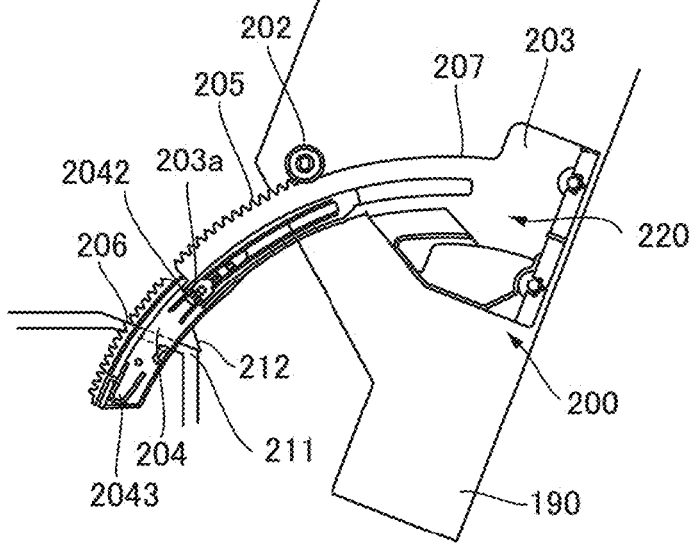
FIG. 8B is an enlarged view illustrating the damper unit in a case where the opening/closing door is in the middle of further closing.
Figure 8C:
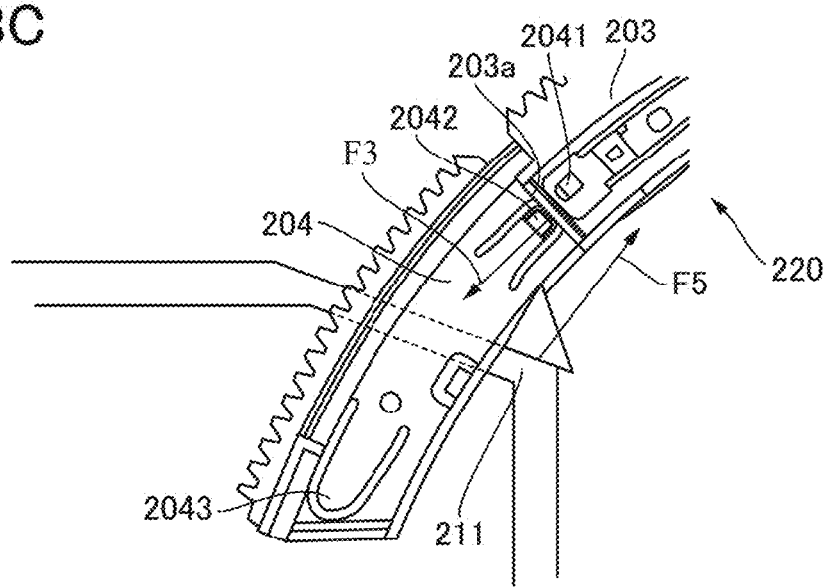
FIG. 8C is an enlarged view illustrating the first and second members in a case where the opening/closing door is in the middle of the further closing.

Next, the operation of the damper unit 200 at the time of a closing operation for closing the opening/closing door 190 from the opening position to the closed position will be described using FIGS. 6B to 8C. FIGS. 7A to 7C illustrate a case where the opening/closing door 190 is in the middle of closing from the opening position. FIGS. 8A to 8C illustrate a case where the opening/closing door 190 is in the middle of further closing.

In a case of closing the opening/closing door 190 from the opening position illustrated in FIG. 6A, the stopper 203a of the first member 203 engages with the engaging hook 2041 of the second member 204 in the state illustrated in FIG. 6B. Thereby, the first and second members 203 and 204 move integrally in the closing direction. At this time, the rack gear 206 of the second member 204 is in the state of engaging with the pinion gear 202, and the resistance force is applied to the opening/closing door 190. The engaging hook 2042 engages with the stopper 203a, and the engagement force of the first and second members 203 and 204 becomes F3.

Then, as illustrated in FIGS. 7B and 7C, the engaging hook 2043 engages with the apparatus body side stopper 210, and the second member 204 is engaged with the apparatus body 100a. As illustrated in FIG. 7C, the engaging hook 2043 engages with the apparatus body side stopper 210, and the engagement force of the second member 204 and the apparatus body 100a becomes F4.

The engagement of the engaging hook 2043 and the apparatus body stopper 210 and the engagement of the engaging hook 2042 and the stopper 203a are arranged such that, when closing the opening/closing door 190, the engagement force F3 becomes larger than the engagement force F4. In the present embodiment, from the opening position illustrated in FIG. 6B to the state illustrated in FIG. 7B, the worker can close the opening/closing door 190 with a force that is smaller than the engagement force F4. Then, in a case of closing the opening/closing door 190 further from the state illustrated in FIG. 7B, the worker needs to apply a force that is larger than the engagement force F4. By applying the force larger than the engagement force F4, the engagement of the engaging hook 2043 and the apparatus body side stopper 210 is released, and the second member 204 is housed in the space inside of the apparatus body 100a.

As described above, since, because the engagement force F4 is smaller than the engagement force F3, the second member 204 is housed in the space inside of the apparatus body 100a by applying the force larger that the engagement force F4, without applying a force equal to or larger that the engagement force F3, the worker can close the opening/closing door 190. Thereafter, the worker can continue to close the opening/closing door 190 with the force smaller than the engagement force F4. Since, as described above, the engagement force F4 is smaller than the engagement force F3, the engagement of the second member 204 and the apparatus body 100a is released without releasing the engagement of the first and second members 203 and 204, so that the first and second members 203 and 204 move integrally in the closing direction with the second member housed in the space inside of the apparatus body 100a. As described above, the damper unit 200 transitions from the state in which the rack gear 206 of the second member 204 engages with the pinion gear 202 to the state in which the rack gear 205 of the first member 203 engages with the pinion gear 202.

When the opening/closing door 190 is further closed from the state illustrated in FIG. 7A, the damper unit 200 transitions to the state illustrated in FIG. 8A. As illustrated in FIGS. 8B and 8C, the second member 204 includes the regulation portion 212 that, when the opening/closing door 190 moves from the third intermediate position described above to a fourth intermediate position located between the third intermediate position and the closed position, abuts against the contacted portion 211 disposed in the apparatus body 100a. When the regulation portion 212 abuts against the contacted portion 211, the engagement of the engaging hook 2042 and the stopper 203a is released. By the regulation of the movement with respect to the apparatus body 100a by the regulation portion 212 as described above, the second member 204 is contracted with respect to the first member 203.

As described above, the engaging hook 2042 engages with the stopper 203a, and the engagement force of the first and second members 203 and 204 becomes F3. On the other hand, an abutment force that can release the movement regulation of the second member 204 by the regulation portion 212 is set to F5 that is larger than F3 (F5>F3). Therefore, when further closing the opening/closing door 190 from the state illustrated in FIG. 8A, if the worker applies a force that is larger than F3 and smaller than F5, the first member 203 moves relatively with respect to the second member 204 whose movement is regulated by the regulation portion 212. Thereby, when the opening/closing door 190 has reached the closed position, the opening/closing door 190 returns to the state illustrated in FIGS. 3A and 3B described above.

As described above, in the present embodiment, when opening the opening closing door 190, the resistance force is continuously applied to the opening/closing door 190 from the first member 203 to the second member 204. on the other hand, when closing the opening closing door 190, the resistance force is continuously applied to the opening/closing door 190 from the second member 204 to the first member 203. That is, since, in the damper unit 200, a range in which the rack member 220 engages with the pinion gear 202 of the rotary member 201 becomes the sum of the length of the rack gear 205 of the first member 203 and the rack gear 206 of the second member 204, it is possible to secure an extended range in which the resistance force can be applied to the opening/closing door 190. Then, in the case where the opening/closing door 190 is in the closed position, the second member is in the contracted position contracted with respect to the first member 203, and the rack member 220 is housed in the space inside of the apparatus body 100a in the state in which the combined length of the first and second members 203 and 204 is shortest. Therefore, it is not necessary to secure a large space so as to house the rack member 220 inside of the apparatus body 100a.

Variant Example

Figure 9:
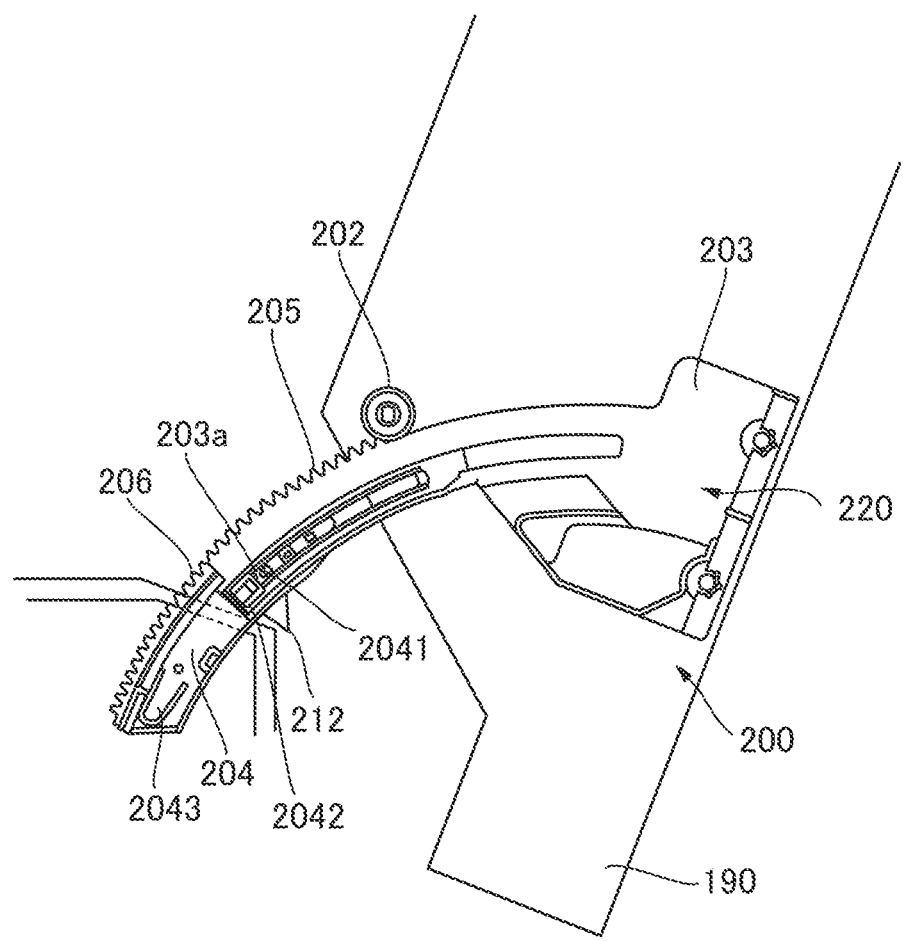
FIG. 9 is a diagram illustrating a variant example that is in a state in which the opening of the opening/closing door is started.

To be noted, while, in the embodiment described above, when opening the opening/closing door 190, as illustrated in FIG. 4B, only the first member 203 is moved after the second member 204 has been engaged with the apparatus body 100a, it is not limited to this. For example, it is acceptable to configure such that, as illustrated in FIG. 9, the engaging hook 2041 of the second member 204 is first engaged with the stopper 203a of the first member 203, and the second member 204 is drawn out from the space inside of the apparatus body 100a. That is, in a state in which the second member 204 is held by the apparatus body, only the first member 203 moves with respect to the second member 204, and the stopper 203a engages with the engaging hook 2041 of the second member 204. Then, by integrally moving the first and second members 203 and 204, the second member 204 is drawn out from the space inside of the apparatus body 100a. In this case, when the opening/closing door 190 is in the opening position, the opening/closing door 190 is brought into the same state that is illustrated in FIG. 6B described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-172451, filed Oct. 27, 2022, which is hereby incorporated by reference herein in its entirety.

What is claimed is:

1. An image forming apparatus configured to form an image on a sheet, the image forming apparatus comprising:
    an apparatus body;
    a door provided in a pivotable manner between a closed position and an opening position with respect to the apparatus body; and
    a resistance applying portion configured to apply a resistance force with respect to the door in response to the door being pivoted,
    wherein the resistance applying portion includes a body support member supported by the apparatus body, and a contact member that receives the resistance force by coming into contact with the body support member,
    wherein the contact member includes a first member supported by the door, and a second member supported by the first member in a contractable and extendable manner between a contracted position contracted with respect to the first member and an extended position extended with respect to the first member,
    wherein the second member is configured to be brought into the contracted position with respect to the first member in a state where the door is in the closed position,
    wherein the second member is configured to be brought into the extended position with respect to the first member by the door having moved from the closed position to a first intermediate position located between the closed position and the opening position, and
    wherein, in response to the door moving from the first intermediate position to the opening position, the second member is configured to apply the resistance force to the door by coming into contact with the body support member in the extended position.

2. The image forming apparatus according to claim 1, wherein, by the door having moved from the closed position to the first intermediate position, the first member is configured to apply the resistance force to the door by coming into contact with the body support member.

3. The image forming apparatus according to claim 2, wherein, by the door having moved from the closed position to a second intermediate position located between the closed position and the first intermediate position, the first member is configured not to come into contact with the body support member, and wherein, in response to the door moving from the second intermediate position to the first intermediate position, the first member is configured to apply the resistance force to the door by coming into contact with the body support member.

4. The image forming apparatus according to claim 2, wherein the contact member includes a first engagement portion and a second engagement portion, wherein, by the door having moved from the closed position to a first position located between the closed position and the first intermediate position, the first engagement portion is configured to move the second member from the contracted position to the extended position with respect to the first member by engaging the second member with the apparatus body and holding the second member with respect to the apparatus body, wherein, in response to the door having moved from the closed position to the first position, the second engagement portion is configured to hold the second member in the extended position with respect to the first member by engaging the first member with the second member, and wherein, in response to the door being moved from the first position to the opening position, the contact member is configured to release engagement of the first engagement portion by engaging the second engagement portion so that the second member moves integrally with the first member.

5. The image forming apparatus according to claim 4, wherein the second member includes a regulation portion configured to abut against a contacted portion disposed in the apparatus body in response to the door having moved from the first position to a second position located between the first position and the closed position, and wherein, in response to the door being moved from the second position to the closed position, a movement of the second member with respect to the apparatus body is regulated by the regulation portion, and the second member is configured to be contracted with respect to the first member by regulation of the movement of the second member by the regulation portion.

6. The image forming apparatus according to claim 2, further comprising a pivot regulation portion disposed in the apparatus body and configured to regulate a pivot of the door in an opening direction from the opening position.

7. The image forming apparatus according to claim 2, further comprising a pivot shaft configured to rotatably support the door with respect to the apparatus body, wherein, when viewed in an axial direction of the pivot shaft, the second member is configured to be contracted and extended with respect to the first member along an arc-shaped path around the pivot shaft as a center, wherein the first member includes a first contact portion configured to come into contact with the body support member, and the second member includes a second contact portion configured to come into contact with the body support member, and wherein, when viewed in the axial direction of the pivot shaft, the first contact portion and the second contact portion are arranged along a circumscribing circle circumscribing the body support member around a center of the pivot shaft as a center.

8. The image forming apparatus according to claim 7, wherein the body support member includes a shaft center secured to the apparatus body, a pinion gear rotatably supported with respect to the shaft center, and a damper portion interposed between the shaft center and the pinion gear so as to attenuate a force in a rotational direction of the pinion gear, and wherein the first contact portion and the second contact portion include rack gears configured to engage with the pinion gear, respectively.

9. The image forming apparatus according to claim 1, wherein the second member is configured to be brought into the extended position with respect to the first member by a relative movement between the first member and the second member occurring before the door, having moved from the closed position, reaches the first intermediate position.

10. The image forming apparatus according to claim 1, wherein the first member and the second member are configured to integrally move together as the door moves from the first intermediate position to the opening position.

* * * * *